(12) United States Patent
Gonjo et al.

(10) Patent No.: US 7,585,355 B2
(45) Date of Patent: Sep. 8, 2009

(54) TEMPERATURE/HUMIDITY EXCHANGER

(75) Inventors: Yoshihide Gonjo, Tokyo (JP); Hideo Ichimura, Tokyo (JP); Mitsuie Matsumura, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 540 days.

(21) Appl. No.: 10/581,359

(22) PCT Filed: Jan. 24, 2005

(86) PCT No.: PCT/JP2005/000833

§ 371 (c)(1),
(2), (4) Date: Jun. 2, 2006

(87) PCT Pub. No.: WO2006/107067

PCT Pub. Date: Oct. 12, 2006

(65) Prior Publication Data

US 2007/0107454 A1     May 17, 2007

(30) Foreign Application Priority Data

Feb. 10, 2004   (JP) .............................. 2004-034084

(51) Int. Cl.
*B01D 53/22*     (2006.01)
*F28D 5/00*     (2006.01)

(52) U.S. Cl. .............................. 96/9; 96/4; 96/7; 96/11; 95/45; 95/52; 429/19; 429/26; 261/104; 261/107; 210/640; 62/304; 62/314; 62/315

(58) Field of Classification Search .................... 96/4, 96/7, 9, 11; 95/45, 52; 429/19, 26, 36; 261/104, 261/107; 210/640; 62/304, 314, 315

See application file for complete search history.

(56) References Cited

U.S. PATENT DOCUMENTS 3,735,559 A * 5/1973 Salemme ....................... 95/52

(Continued)

FOREIGN PATENT DOCUMENTS

JP    10-074532    3/1998

OTHER PUBLICATIONS

U.S. Appl. No. 10/581,359, filed Jun. 2, 2006, Gonjo et al.

*Primary Examiner*—Jason M Greene
(74) *Attorney, Agent, or Firm*—Oblon, Spivak, McClelland, Maier & Neustadt, P.C.

(57) ABSTRACT

A temperature-humidity exchanger comprising: a moisture permeable membrane which transmits moisture therethrough; a dry gas separator in which low-temperature dry gas is caused to flow; and a wet gas separator in which high-temperature wet gas is caused to flow, in which the moisture permeable membrane, the dry gas separator, the moisture permeable membrane, and the wet gas separator are repeatedly stacked in the stated order, wherein in the dry gas separator and the wet gas separator: a plurality of channel grooves which are divided by half in the stacking direction, are open to a direction in which the channel grooves come into contact with the moisture permeable membrane, and are arrayed parallel to one another are provided; an aggregate communication groove which is made to communicate with both end portions of the plurality of channel grooves, for aggregating gas caused to flow through the channel grooves to at least one is provided; and a supply manifold and an exhaust manifold which are made to communicate with the aggregate communication groove and penetrate the separators in the stacking direction are provided; and a flow of the dry gas caused to flow in the channel grooves of the dry gas separators and a flow of the wet gas caused to flow in the channel grooves of the wet gas separators are counterflows.

7 Claims, 12 Drawing Sheets

U.S. PATENT DOCUMENTS

| | | | | |
|---|---|---|---|---|
| 4,110,220 A | * | 8/1978 | Lavender | 210/321.75 |
| 5,382,478 A | * | 1/1995 | Chow et al. | 429/26 |
| 5,965,288 A | * | 10/1999 | Okamoto | 429/26 |
| 6,403,249 B1 | * | 6/2002 | Reid | 429/26 |
| 6,659,433 B2 | * | 12/2003 | Kusano et al. | 261/104 |
| 6,666,909 B1 | * | 12/2003 | TeGrotenhuis et al. | 95/273 |
| 6,737,183 B1 | * | 5/2004 | Mazzucchelli et al. | 429/26 |
| 7,258,329 B2 | * | 8/2007 | Sasamoto | 261/104 |
| 7,261,966 B2 | * | 8/2007 | Wei | 429/38 |
| 7,311,760 B2 | * | 12/2007 | Matsumura et al. | 96/4 |
| 7,404,848 B2 | * | 7/2008 | Okada et al. | 96/7 |
| 2005/0053815 A1 | * | 3/2005 | Yang et al. | 429/26 |
| 2005/0188844 A1 | | 9/2005 | Matsumura et al. | |

FOREIGN PATENT DOCUMENTS

| | | |
|---|---|---|
| JP | 11-185777 | 7/1999 |
| JP | 2000-164229 | 6/2000 |
| JP | 2001-307753 | 11/2001 |
| JP | 2002-170584 | 6/2002 |
| JP | 2003-314983 | 11/2003 |
| WO | WO 2006/107067 A1 * | 10/2006 |

* cited by examiner

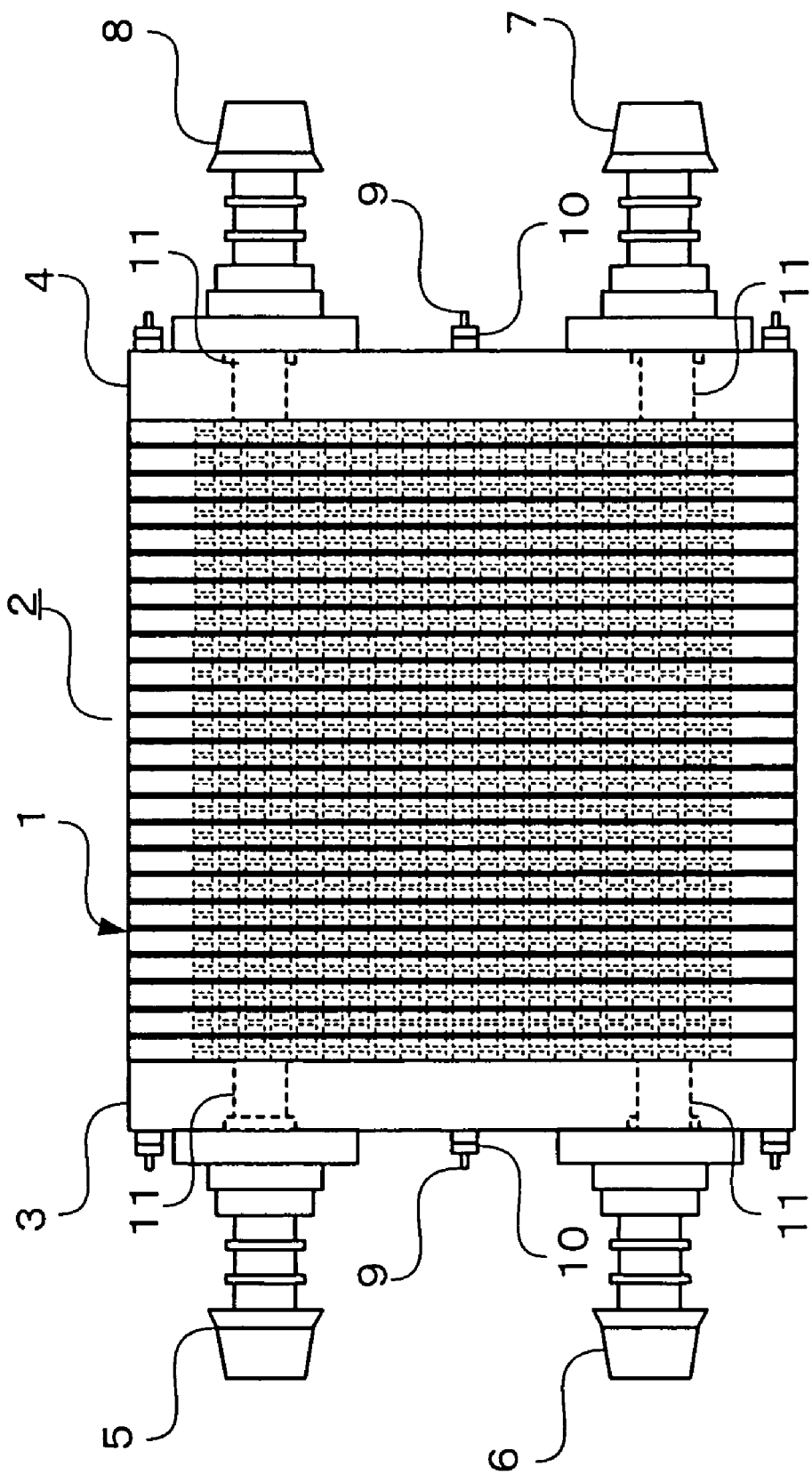

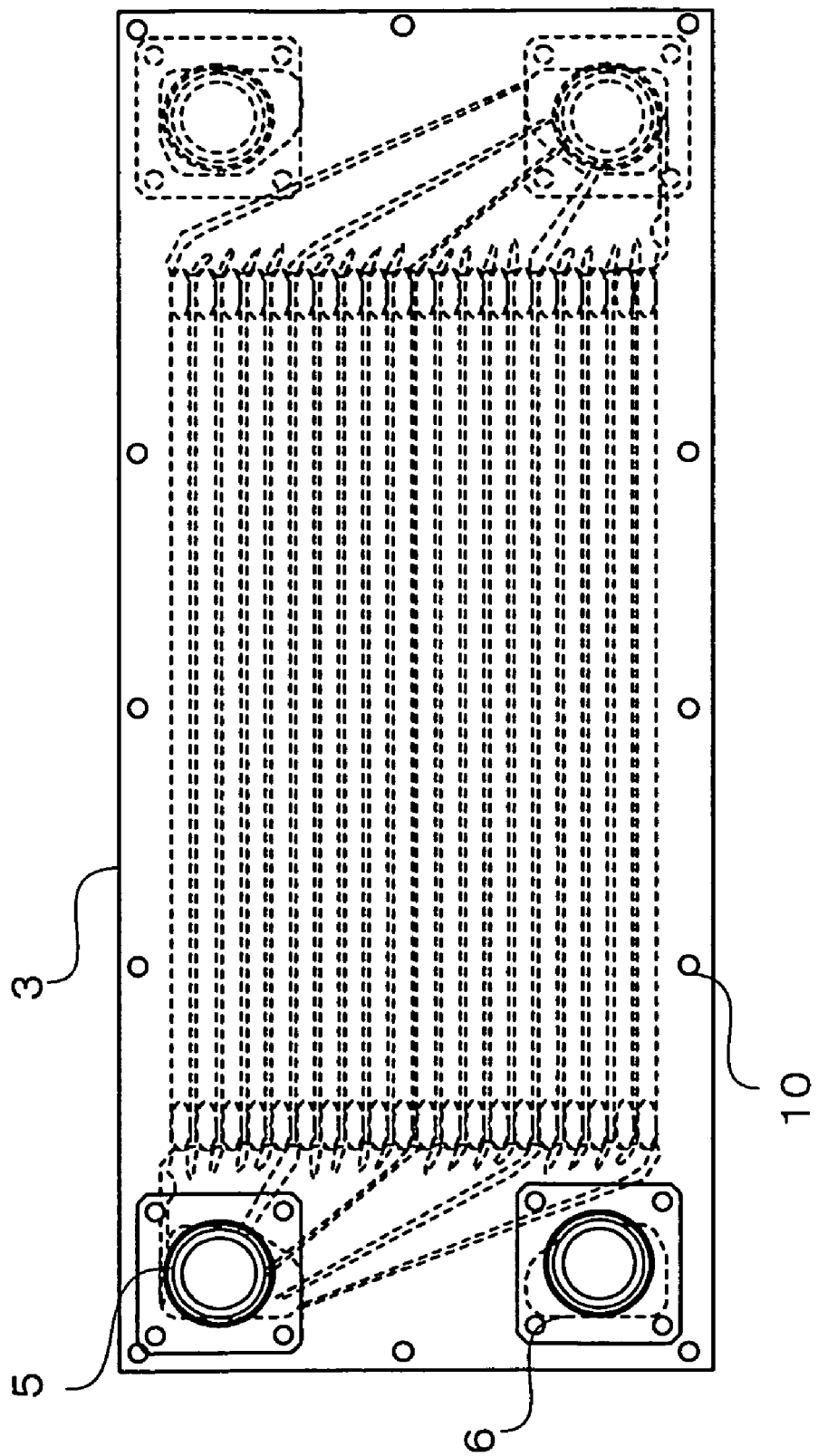

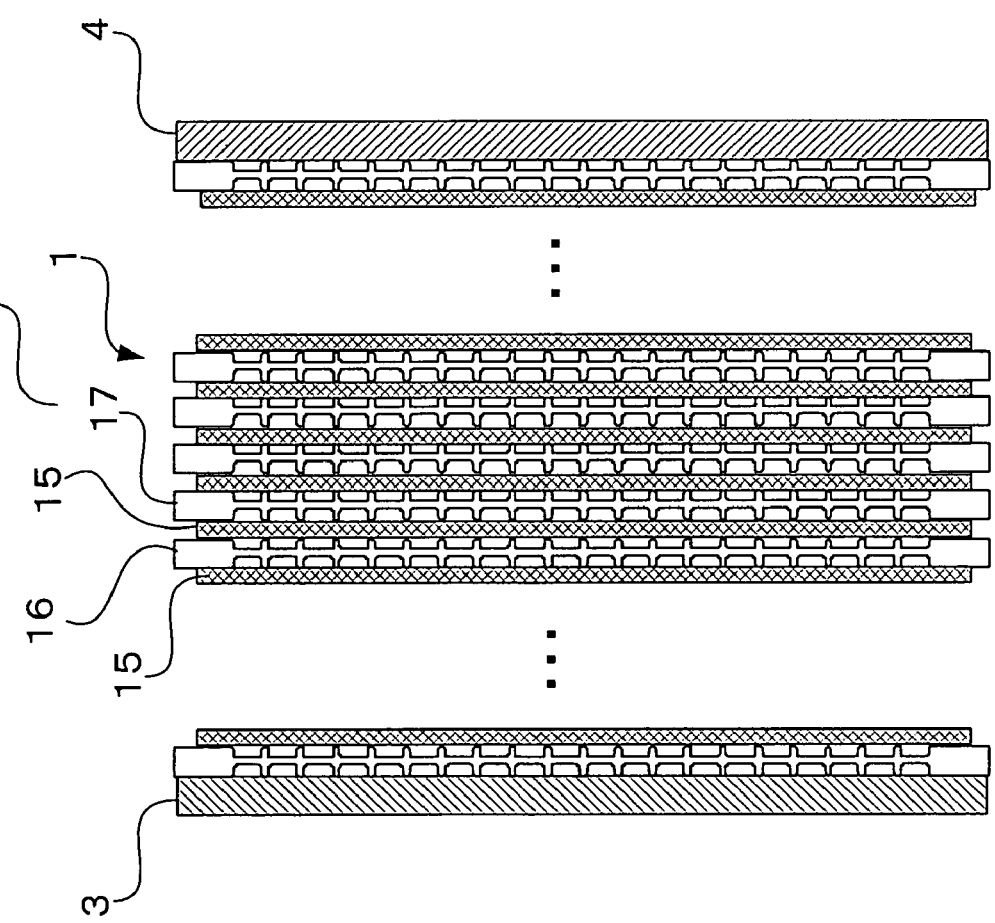

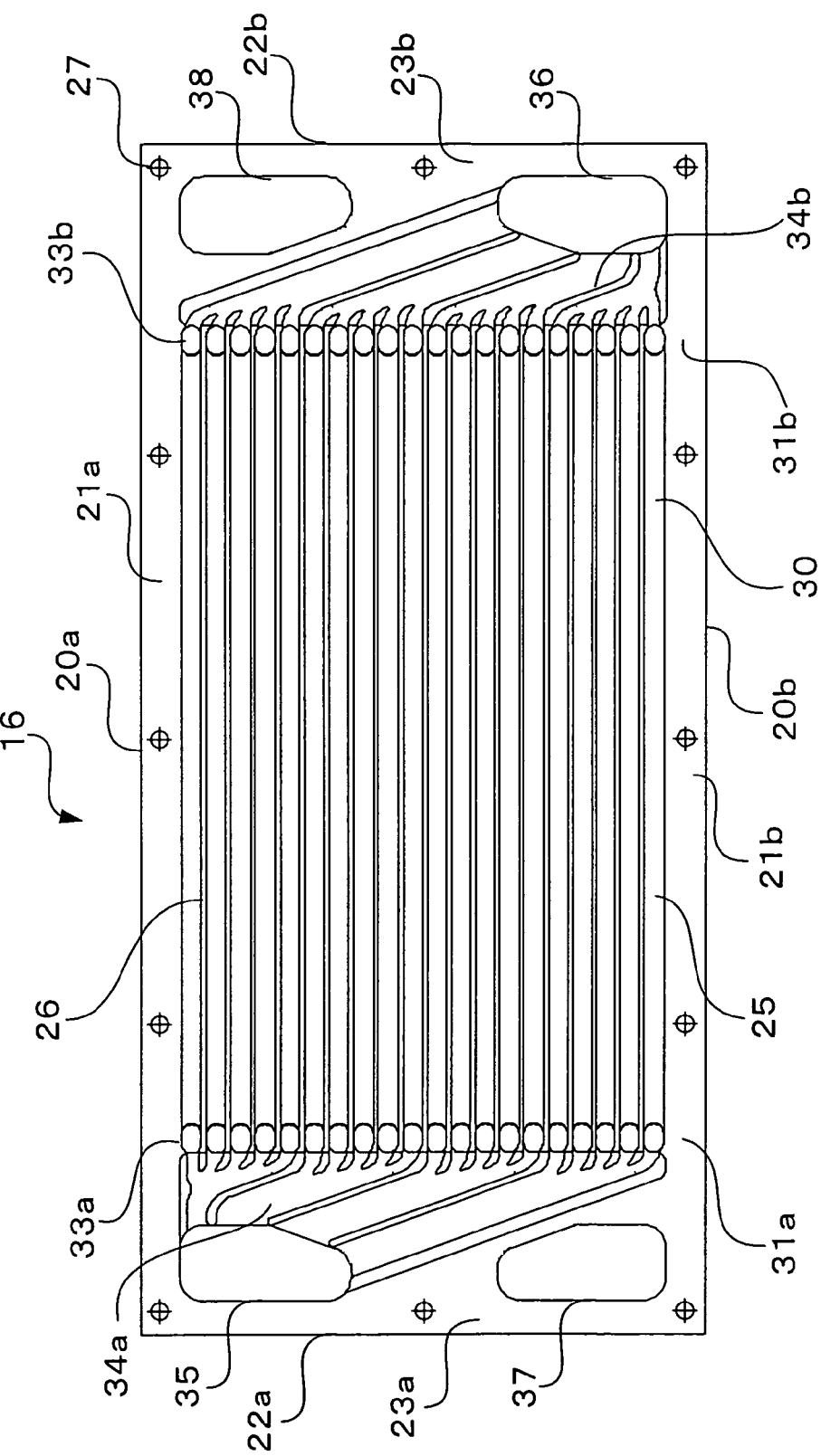

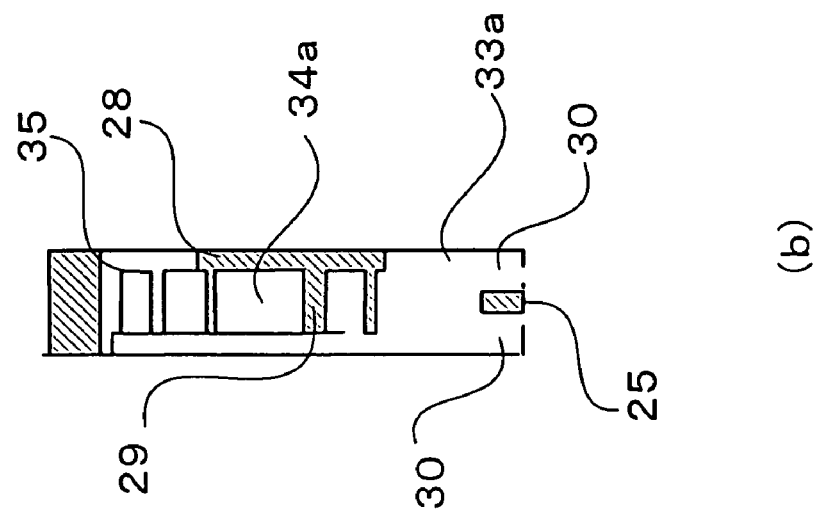
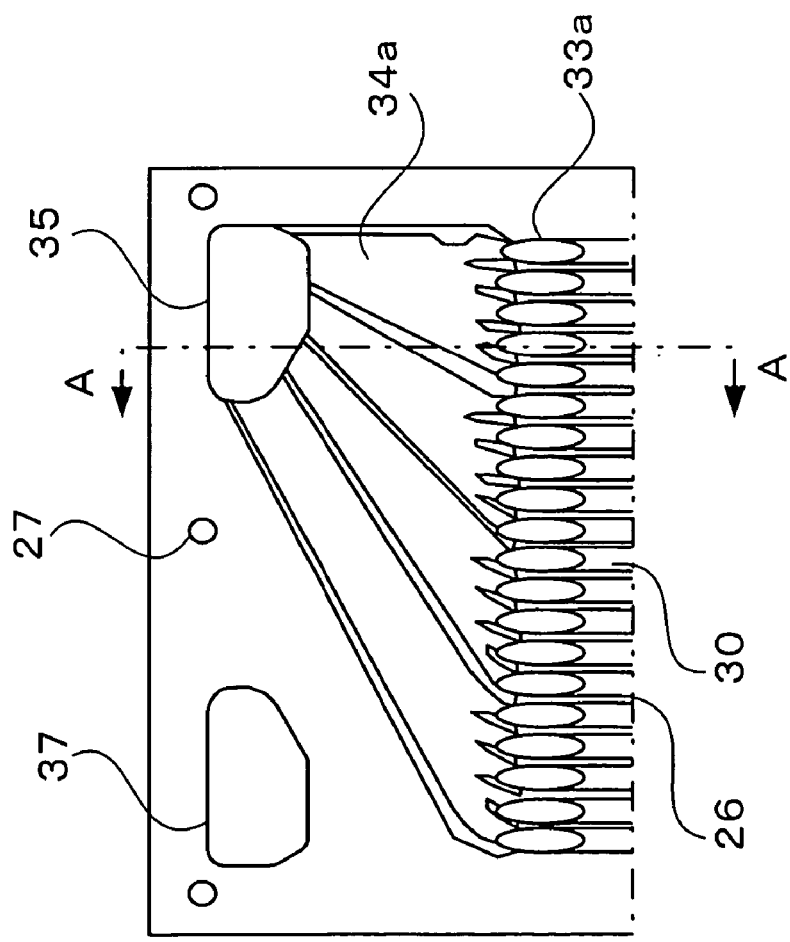

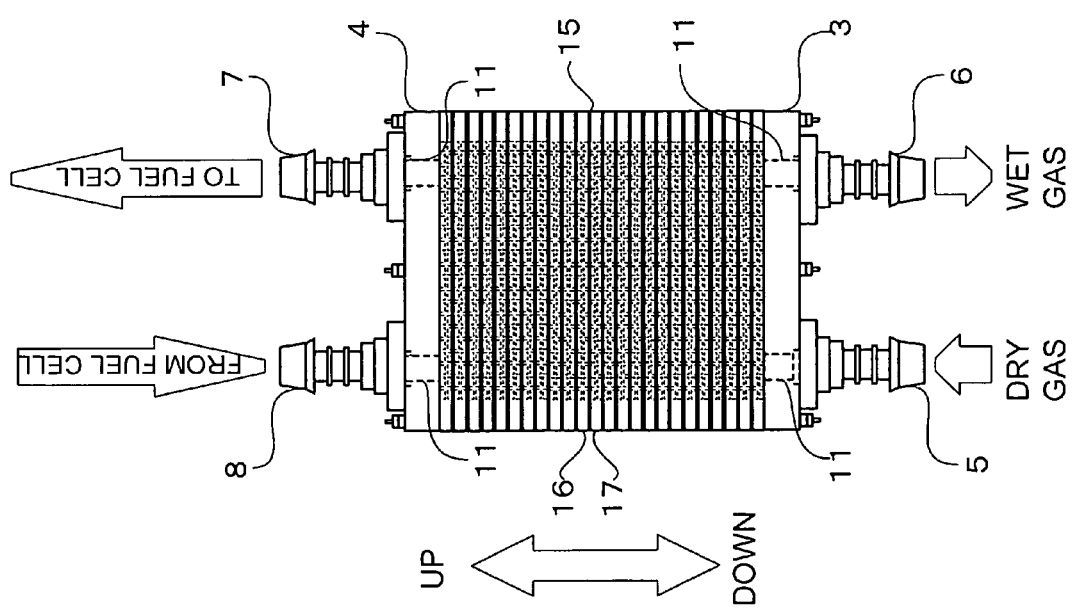

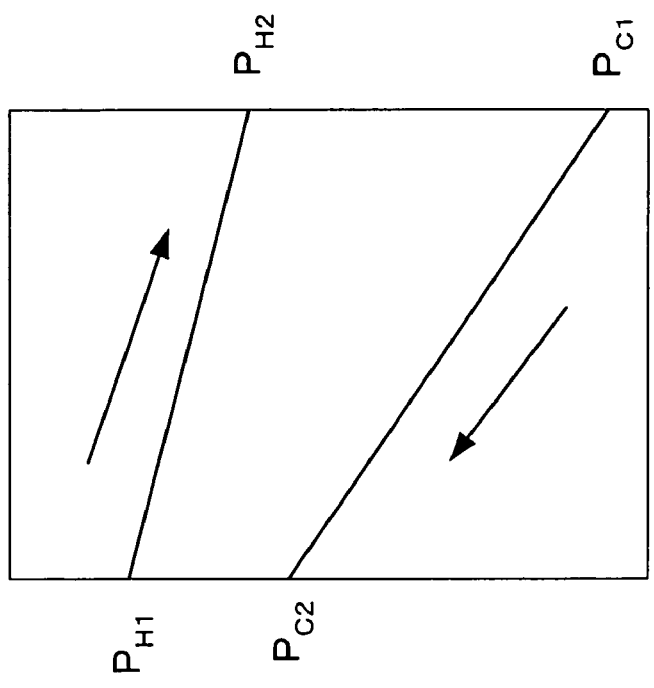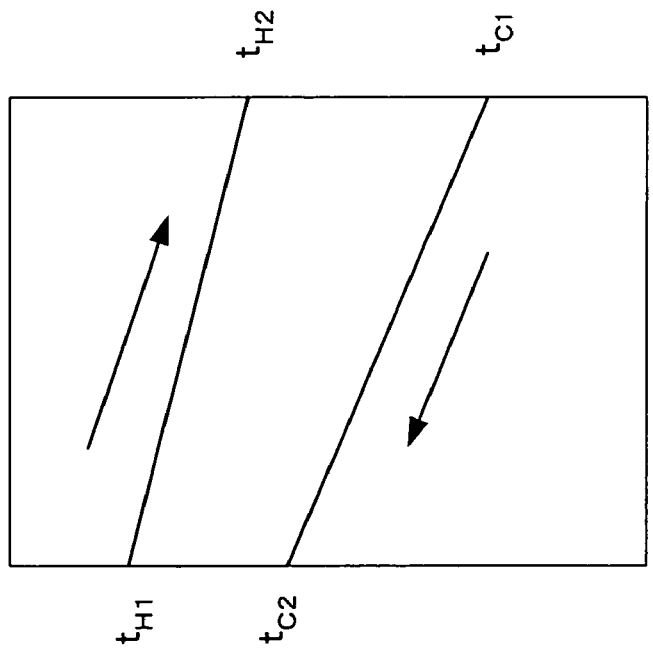

FIG.8

| | Embodiment 1 | Comparative Example 1 | |
|---|---|---|---|
| depth of channel groove | minimum | large | small |
| Temperature efficiency (%) | 92 | 75 | |
| Humidity efficiency (%) | 88 | 53 | |
| Dew point (°C) | 70 | 57 | |
| Pressure loss (Pa) | 0.83 | 0.47 | 1.88 |

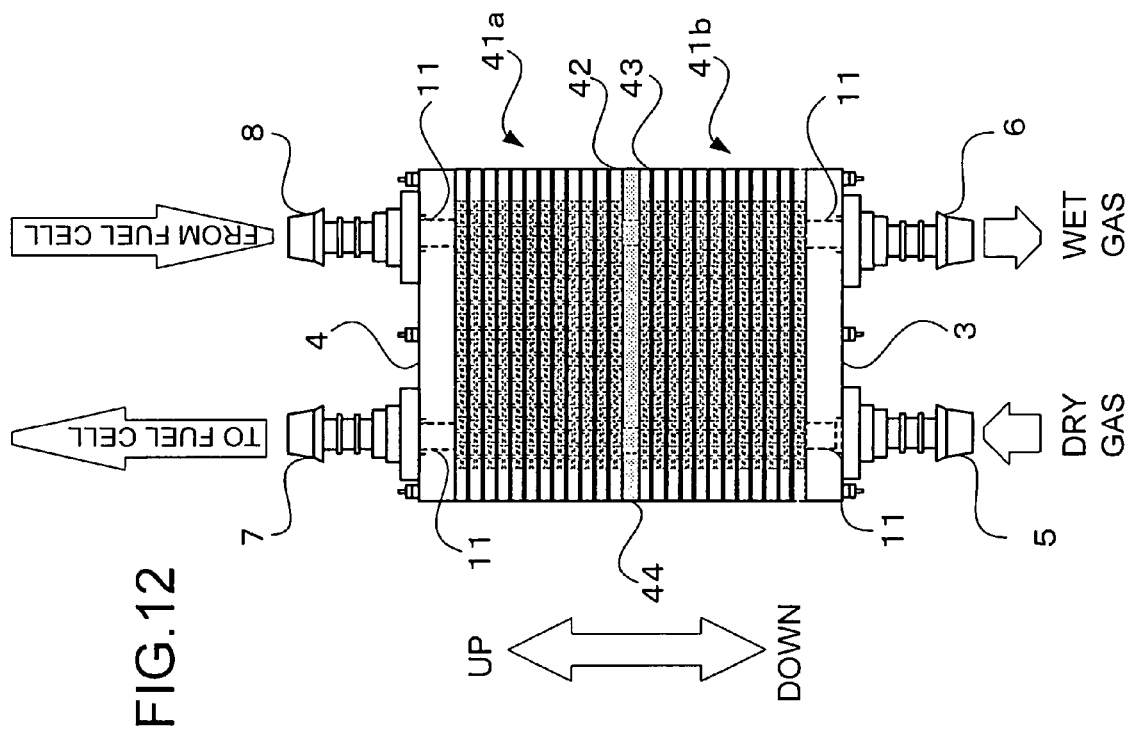

1

TEMPERATURE/HUMIDITY EXCHANGER

TECHNICAL FIELD

The present invention relates to a temperature-humidity exchanger for heating and humidifying low-temperature dry gas by heat and moisture, which are transmitted, through a moisture permeable membrane through which the moisture is transmitted, from high-temperature wet gas, and particularly, to a temperature-humidity exchanger for a fuel cell, for heating and humidifying unreacted gas by heat and moisture, which are transmitted from exhaust gas of the fuel cell.

BACKGROUND ART

In a polymer electrolyte fuel cell, an ion exchange membrane has exchange groups for hydrogen ions in molecules thereof, and functions as an ion conductive substance by being saturated and hydrous. Then, when the ion exchange membrane is dried, ion conductivity thereof decreases, and cell performance of the fuel cell significantly decreases. Accordingly, in order to prevent the ion exchange membrane from being dried, unreacted gas is humidified in advance by using a temperature-humidity exchanger with a structure in which water and the unreacted gas are caused to flow on both surfaces of a moisture permeable membrane such as a solid polymer electrolyte membrane.

This temperature-humidity exchanger has a construction in which the moisture permeable membrane is sandwiched by a separator provided with a channel groove through which the unreacted gas is caused to flow and the other separator provided with a channel groove through which humidification water is caused to flow. Projections opposed to a flow of the unreacted gas are disposed on bottoms of the meandering gas channel grooves formed inside of the separators by being partitioned by ribs, and the unreacted gas becomes a turbulent flow to be effectively stirred, and is brought into effective contact with the moisture permeable membrane, thereby enhancing humidity efficiency (see, for example, Patent Document 1).

However, a water supply device which prepares water heated as humidification water is separately required, resulting in extra cost. In this connection, a temperature-humidity exchanger for performing a temperature-humidity exchange between the exhaust gas exhausted from the fuel cell and the unreacted gas is proposed. With regard to the temperature-humidity exchanger concerned, a temperature-humidity exchanger composed of a first humidification block and a second humidification block is coupled to a fuel cell main body via a spacer. The air as the unreacted gas is caused to flow to the first humidification block, and further to the second humidification block, and is then supplied to an air electrode of the fuel cell main body. Meanwhile, the exhaust gas containing moisture, which is exhausted from the air electrode of the fuel cell, is introduced into the temperature-humidity exchanger, is caused to flow in a direction reverse to that of the unreacted gas, and is discharged to the outside from an exhaust gas port (see, for example, Patent Document 2).

Further, a temperature-humidity exchanger using the exhaust gas has a temperature-humidity exchange cell formed by alternately stacking mesh plates and water-holding porous bodies in order to prevent the moisture permeable membrane from being dried. The exhaust gas and the unreacted gas, which are introduced into the temperature-humidity exchange cell, are brought into contact with each other via the water-holding porous bodies, and temperatures and humidities thereof are exchanged (see, for example, Patent Document 3).

Patent Document 1: JP 11-185777 A
Patent Document 2: JP 2002-170584 A
Patent Document 3: JP 2000-164229 A

DISCLOSURE OF THE INVENTION

Problems to be Solved by the Invention

The moisture exchange is performed in such a manner that water droplets formed by condensation of the moisture from wet gas cover a surface of each rib, the water droplets contact the moisture permeable membrane, and the moisture is transmitted to the channel through which dry gas is caused to flow. However, when height of the channel is large, the water droplets move to a lower portion of the channel owing to an influence of gravity, and the water droplets do not contact the moisture permeable membrane provided above the channel. Accordingly, the moisture is not supplied to the upper channel through which the dry gas is caused to flow. Meanwhile, there has been a problem in that, when height of each rib is large, an amount of heat transmitted through the rib is small, so a dew point is not raised since the dry gas is not sufficiently heated owing to a shortage of the heat transmission.

Further, when the height of each rib is large, the water droplets move to the lower portion of the channel, and the moisture is mainly transmitted to the lower channel. However, an equivalent of the heat is also transmitted to the upper channel through the ribs, and accordingly, a transmissibility of the moisture and the heat differs between the upper and lower channels. Therefore, the moisture is transmitted much and the heat is transmitted little to the lower channel, and the heat is transmitted much and the moisture is transmitted little to the upper channel. Accordingly, a large difference in dew point occurs between the upper and lower channels. In order to restrict the heat transmission to the above through the separator, it is necessary to form the separator of a high heat-insulating material. In this case, a temperature difference between both surfaces of the separator is increased more and more, thereby increasing thermal deformation thereof. When such thermal deformation increases, it is concerned that supporting of the moisture permeable membrane becomes uncertain following use thereof for a long period of time.

In view of this, when it is considered that, in the case of a laminar flow, heat resistance and mass transfer resistance on the gas side are reduced more as the height of the channel is smaller, the dew point can be raised by reducing the height of the channel. However, when the height of the channel is reduced, a sudden pressure increase occurs owing to narrowness of a port of a gas supply inlet, and there has been a problem in that the pressure exceeds an allowable pressure of a pressure loss. Further, when the gas pressure is increased in consideration of an allowance for the pressure loss, there occurs a problem in that the pressure at the supply inlet of the temperature-humidity exchanger exceeds an allowable pressure thereof.

When the projections opposed to the flow of a reactant gas are provided on the bottoms of the gas channel grooves, the temperature efficiency and the humidity efficiency are enhanced to some extent owing to an effect of the turbulent flow; however, a pressure loss in the turbulent flow is proportional to a square of a flow rate thereof (meanwhile, a pressure loss in the laminar flow is proportional to a flow rate thereof).

Accordingly, the pressure loss owing to the turbulent flow increases, and when a linear velocity of the flow is doubled, the pressure loss is quadrupled. The pressure loss in the turbulent flow cannot be restricted to equal to or less than 0.98 kPa (100 mm $H_2O$) as the allowable pressure.

Further, when the mesh plates and the water-holding porous bodies are alternately stacked, meshes cause turbulence in the gas flow, and the pressure loss in the channel cannot be restricted to the allowable pressure or less. Still further, the gas flow becomes nonuniform in the mesh plates following the turbulence, and the transmissibility of the moisture is decreased following a reduction of an effective area of the moisture permeable membrane, and accordingly, there has been a problem in that the humidity efficiency is decreased.

It is an object of the present invention to provide a temperature-humidity exchanger which outputs gas having a high dew point and has a sufficiently low pressure loss.

Means for Solving Problems

In a temperature-humidity exchanger according to the present invention including a moisture permeable membrane which transmits moisture therethrough; a dry gas separator in which low-temperature dry gas is caused to flow; and a wet gas separator in which high-temperature wet gas is caused to flow, in which the moisture permeable membrane, the dry gas separator, the moisture permeable membrane, and the wet gas separator are repeatedly stacked in the stated order, in the dry gas separator and the wet gas separator: a plurality of channel grooves which are divided by half in the stacking direction, are open to a direction in which the channel grooves come into contact with the moisture permeable membrane, and are arrayed parallel to one another are provided; an aggregate communication groove which is made to communicate with both end portions of the plurality of channel grooves, for aggregating gas caused to flow through the channel grooves to at least one is provided; and a supply manifold and an exhaust manifold which are made to communicate with the aggregate communication groove and penetrate the separators in the stacking direction are provided; and a flow of the dry gas caused to flow in the channel grooves of the dry gas separators and a flow of the wet gas caused to flow in the channel grooves of the wet gas separators are counterflows.

Effect of the Invention

An effect of the temperature-humidity exchanger according to the present invention is that the temperature efficiency and the humidity efficiency are improved by flowing the same gas in the channel grooves divided by half in a stacking direction, thereby making it possible to raise the dew point of the output gas. Further, even if the depth of the channel grooves is decreased, both of the channel grooves regarded to have a double depth and an aggregate communication groove which aggregates the plural channel grooves are made to communicate with each other, so a spot where a hydraulic equivalent diameter of the channel through which the gas is caused to flow becomes extremely small is not found, thereby making it possible to restrict the pressure loss to the allowable pressure loss or less.

BRIEF DESCRIPTION OF THE DRAWINGS

FIG. 1 A side view of a temperature-humidity exchanger according to Embodiment 1 of the present invention.

FIG. 2 A plan view of the temperature-humidity exchanger of Embodiment 1.

FIG. 3 A partial cross-sectional view of a temperature-humidity exchange stacked body of Embodiment 1.

FIG. 4 A plan view of a dry gas separator of the temperature-humidity exchange stacked body of Embodiment 1.

FIG. 5 A detailed plan view of FIG. 4, and a partial cross-sectional view of FIG. 4.

FIG. 6 A view showing a state where the temperature-humidity exchanger is installed.

FIG. 7 Views showing states where temperatures and humidities of dry gas and wet gas are changed.

FIG. 8 A table showing actual measurement values of temperature efficiencies, humidity efficiencies, dew points, and pressure losses of the temperature-humidity exchangers of Embodiment 1 and Comparative Example 1.

FIG. 12 A side view of a temperature-humidity exchanger according to Embodiment 3 of the present invention.

BEST MODE FOR CARRYING OUT THE INVENTION

Embodiment 1

Figure 9:
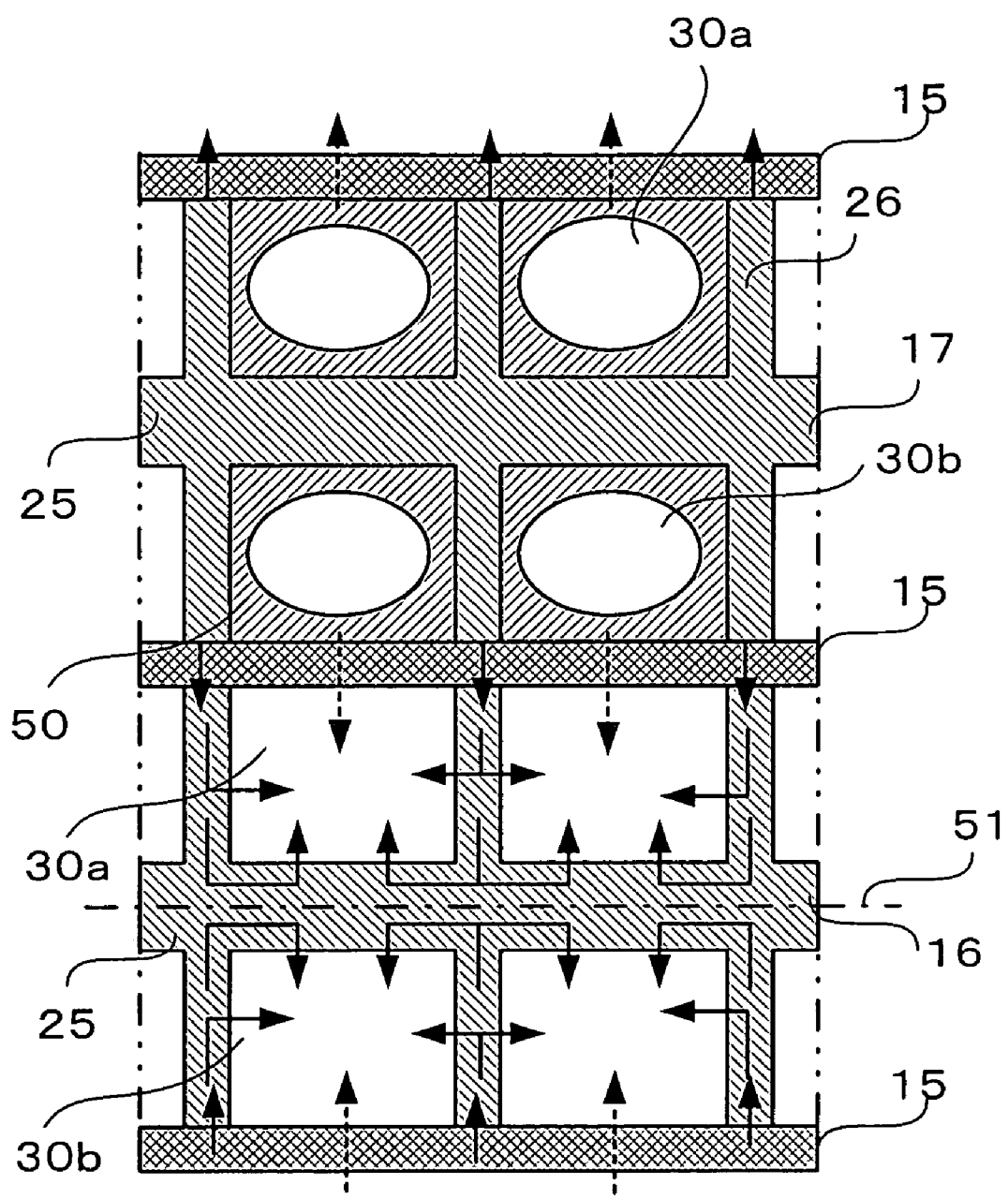
FIG. 9 A view showing a state where heat and moisture are exchanged by using the temperature-humidity exchanger of Embodiment 1.

FIG. 1 is a side view of a temperature-humidity exchanger according to Embodiment 1 of the present invention. FIG. 2 is an upper plan view of the temperature-humidity exchanger of Embodiment 1. FIG. 3 is a partial cross-sectional view of temperature-humidity exchange cells. FIG. 4 is a plan view of a dry gas separator of the temperature-humidity exchange cell. Note that, in the following description, dry gas is described as air in which temperature is approximately room temperature and relative humidity is approximately zero. Further, wet gas is described as oxidizer outlet gas of a polymer electrolyte fuel cell, for example, in which temperature is 70° C. or more and relative humidity is 90% or more.

As shown in FIGS. 1 and 2, a temperature-humidity exchanger of Embodiment 1 includes a temperature-humidity exchange stacked body 2 in which a plurality of temperature-humidity exchange cells 1 are stacked, an inlet retainer plate 3 and an outlet retainer plate 4 which sandwich the temperature-humidity exchange stacked body 2 from both surfaces thereof, a dry gas input manifold 5 and a wet gas outlet manifold 6 which are fixedly attached to the inlet retainer plate 3, a dry gas outlet manifold 7 and a wet gas inlet manifold 8 which are fixedly attached to the outlet retainer plate 4, and bolts 9 and nuts 10 which fasten the temperature-humidity exchange stacked body 2 while sandwiching the temperature-humidity exchange stacked body 2 by the inlet retainer plate 3 and the outlet retainer plate 4. In the temperature-humidity exchange stacked body 2, a cross section thereof perpendicular to the stacking direction is rectangular, in which a dimension of long sides is 32 cm, and a dimension of short sides is 15 cm.

The inlet retainer plate 3 and the outlet retainer plate 4 are rectangular with the same shape as the cross section of the temperature-humidity exchange stacked body 2, and two holes 11 extending through each of the retainer plates in the thickness direction thereof are provided along each short side of the temperature-humidity exchange stacked body 2. The dry gas inlet manifold 5 and the wet gas outlet manifold 6 communicate with the two holes 11 of the inlet retainer plate 3, respectively, and gas channels are thus constituted. Further, the dry gas outlet manifold 7 and the wet gas inlet manifold 8 communicate with the two holes 11 of the outlet retainer plate 4, respectively, and the gas channels are thus constituted. The inlet retainer plate 3 and the outlet retainer plate 4 are made of stainless, in which long sides are 32 cm long, short sides are 15 cm long, and a thickness is 1 cm.

Next, a description will be made of each temperature-humidity exchange cell 1, referring to FIG. 3. The temperature-humidity exchange cell 1 includes moisture permeable membranes 15 capable of transmitting moisture therethrough, and dry gas separators 16 and wet gas separators 17, which sandwich the moisture permeable membranes 15 from both surfaces thereof. The moisture permeable membrane 15, the dry gas separator 16, the moisture permeable membrane 15, and the wet gas separator 17 are repeatedly stacked, and the temperature-humidity exchange stacked body 2 is constituted. At both ends of the temperature-humidity exchange stacked body 2 in the stacking direction, the inlet retainer plate 3 and the outlet retainer plate 4 are stacked on the dry gas separators 16 or the wet gas separators 17.

Each moisture permeable membrane 15 is a membrane which is interposed between the high-temperature wet gas and the low-temperature dry gas and is capable of transmitting the moisture therethrough, and is mainly formed of a porous polytetrafluoroethylene (PTFE) resin. A thickness of the moisture permeable membrane 15 is approximately 100 μm.

A material of the dry gas separator 16 and the wet gas separator 17 is, for example, a polyphenylene sulfide (PPS) resin, and the dry gas separator 16 and the wet gas separator 17 are molded by a resin molding method. A shape of the dry gas separator 16 and the wet gas separator 17 is rectangular parallelepiped, in which long sides are 32 cm long, short sides are 15 cm long, and a thickness is 10 mm.

Next, a description will be made of the dry gas separator 16, referring to FIGS. 4 and 5. FIG. 5A is a partial plan view of an end of the dry gas separator, to which the dry gas is supplied. FIG. 5B is a cross-sectional view taken along the line A-A of FIG. 5A. Note that, the wet gas separator 17 is in an axisymmetric relationship to the dry gas separator 16 with respect to a short-side center line, so like components of the wet gas separator 17 is denoted by the same reference numerals as those of the dry gas separator 16, and a description thereof is omitted.

The dry gas separator 16 is rectangular, and a frame thereof is composed of lateral frame members 21a and 21b extending along long sides 20a and 20b, and end frame members 23a and 23b extending along short sides 22a and 22b. On a center portion of the frame, there are provided fins 25 bridged between center portions of the lateral frame member 21a and the lateral frame member 21b, and ribs 26 vertically protruding at an equal interval from the fins 25 in parallel to the long sides 20a and 20b. Several ten first channel grooves 30 are formed of the fins 25 and the ribs 26 on both surfaces of the fins 25. The fins 25 have a thickness of 3 mm. The ribs 26 have a thickness of 1 mm and a height of 3.5 mm. An upper end portion of each rib 26 is chamfered with a radius of 0.2 mm, and a width of a flat portion thereof becomes 0.6 mm. Each first channel groove 30 on one surface of the dry gas separator 16 has a depth of 3.5 mm and a width of 5 mm. A bottom portion of each first channel groove 30 is chamfered with a radius of 0.5 mm.

Further, in the dry gas separator 16, there are provided communication holes 33a and 33b which make the first channel grooves 30 communicate with each other at both end portions 31a and 31b thereof, the first channel groves 30 being provided on both surfaces of the dry gas separator 16. The communication holes 33a and 33b are oval holes with a minor axis of 5 mm, a major axis of 7 mm, and a depth of 3 mm.

Further, in the dry gas separator 16, there are provided aggregate communication grooves 34a, in each of which outlets of five communication holes 33a are aggregated to one, and a width is made narrower as being apart from the communication holes 33a, and a first dry gas supply manifold 35 which communicates with end portions of the aggregate communication grooves 34a opposite to the communication hole 33a. The aggregate communication grooves 34a are surrounded by the lateral frame members 21a and 21b, a bottom portion 28 extending from the end frame member 23a to an inside of the dry gas separator 16, and bridges 29 projecting from the bottom portion 28 in the thickness direction.

Further, in the dry gas separator 16, there are provided aggregate communication grooves 34b, in each of which outlets of five communication holes 33b are aggregated to one, and a width is made narrower as being apart from the communication holes 33b, and a first dry gas supply manifold 36 which communicates with end portions of the aggregate communication grooves 34b opposite to the communication hole 33b. The aggregate communication grooves 34b are surrounded by the bottom portion 28 and the bridges 29 as the aggregate communication grooves 34a.

Note that, though each of the aggregate communication grooves 34a and 35b is divided into four, the number of grooves just needs to be determined as appropriate in consideration of flow rates of the gas, a pressure difference between the gases, and the like, and each of the aggregate communication grooves may be one groove without being subjected to the division.

Further, in the dry gas separator 16, a first wet gas exhaust manifold 37 is provided adjacent to the first dry gas supply manifold 35 along the short side 22a so as to penetrate the dry gas separator 16, and a first wet gas supply manifold 38 is provided adjacent to the first dry gas exhaust manifold 36 along the short side 22b so as to penetrate the dry gas separator 16.

Still further, in the dry gas separator 16, screw holes 27 are provided along an outer circumference thereof. The bolts 9 penetrate through the screw holes 27, and the dry gas separator 16 is fastened by the nuts 10 from both end portions of the bolts 9, thereby being fixed. The first dry gas supply manifold 35, first dry gas exhaust manifold 36, first wet gas exhaust manifold 37, and first wet gas supply manifold 38 are individually provided at positions point-symmetric to one another by 180 degrees with respect to the center point of the dry gas separator 16.

Note that a portion of the moisture permeable membrane 15, which faces to the first channel groove 30, effectively contributes to the temperature exchange and the humidity exchange.

Meanwhile, in the wet gas separator 17, second channel grooves, a second wet gas supply manifold, a second wet gas exhaust manifold, a second dry gas supply manifold, and a second dry gas exhaust manifold, which are not shown, are provided at positions thereof superposed on the first channel grooves 30, the first wet gas supply manifold 38, the first wet gas exhaust manifold 37, the first dry gas supply manifold 35, and the first dry gas exhaust manifold 36 when the wet gas separator 17 is stacked on the dry gas separator 16. Then, the wet gas separator 17 is similar to one in which the dry gas separator 16 is turned inside out in the short side direction.

Note that the first dry gas supply manifold 35 and first wet gas exhaust manifold 37 of the dry gas separator 16 communicate with the holes 11 of the inlet retainer plate 3. Further, the second dry gas exhaust manifold and second wet gas supply manifold of the wet gas separator 17 communicate with the holes 11 of the outlet retainer plate 4.

Further, in each moisture permeable membrane 15, through holes (not shown) are provided at positions thereof superposed on the dry gas supply manifold 35, the first dry gas exhaust manifold 36, the first wet gas supply manifold 38, and the first wet gas exhaust manifold 37 when each moisture permeable membrane 15 is stacked on the dry gas separator 16 and the wet gas separator 17.

As shown in FIG. 3, each moisture permeable membrane 15 is supported by tip end portions of the ribs 26 of the dry gas separator 16 and tip end portions of ribs of the wet gas separator 17.

The temperature-humidity exchanger with such a construction is provided as shown in FIG. 6. To be specific, the temperature-humidity exchanger is disposed horizontally so that normal lines to the moisture permeable membranes 15 can be directed to the vertical direction, and following this, the dry gas separators 16 and the wet gas separators 17 are also stacked so as to horizontally contact the moisture permeable membranes 15.

Further, the inlet retainer plate 3 is stacked so as to contact the lowermost temperature-humidity exchange cell 1, and the outlet retainer plate 4 is stacked so as to contact the uppermost temperature-humidity exchange cell 1.

Next, a description will be made of a state where the moisture and the heat are transmitted from the wet gas to the dry gas by using the temperature-humidity exchanger according to this Embodiment 1 with reference to FIGS. 4 and 6. The dry gas is supplied from the dry gas inlet manifold 5, passes through the hole 11 of the inlet retainer plate 3, and is caused to flow to the first dry gas supply manifold 35 provided in the dry gas separator 16. Further, the dry gas passes from the aggregate communication grooves 34a of the dry gas separator 16 through the communication holes 33a, and is caused to flow to the first channel grooves 30 provided on both surfaces of each dry gas separator 16. Then, the dry gasses caused to flow from the first channel grooves 30 on both surfaces of the dry gas separator 16 are mixed together in the communication holes 33b, and the mixed gas is guided to the first dry gas exhaust manifold 36 from the aggregate communication grooves 34b. Then, the mixed dry gas passes from the first dry gas exhaust manifold 36 through the hole 11 of the outlet retainer plate 4, and is caused to flow to the dry gas outlet manifold 7. This dry gas is supplied to the fuel cell.

The dry gas supplied to the fuel cell is humidified by water following the reaction of hydrogen and oxygen and by water transmitted through ion exchange membranes accompanied with protons, further, is heated by heat of reaction, which is accompanied with the reaction of hydrogen and oxygen, and is then discharged as high-temperature wet gas. As described above, in the wet gas, temperature is higher and humidity is also higher as compared with those of the dry gas.

This wet gas is supplied from the wet gas inlet manifold 8, passes through the hole 11 of the outlet retainer plate 4, and is drawn into the second wet gas supply manifold provided in each wet gas separators 17. Further, the wet gas passes from the aggregate communication grooves 34b of the wet gas separator 17 through the communication holes 33b, and is caused to flow to the second channel grooves provided on both surfaces of each wet gas separator 17. Then, the wet gases caused to flow from the second channel grooves on both surfaces of the wet gas separator 17 are mixed together in the communication holes 33a, and the mixed gas is guided to the second wet gas exhaust manifold from the aggregate communication grooves 34a. Then, the mixed wet gas passes from the second wet gas exhaust manifold through the hole 11 of the inlet retainer plate 3, and is guided to the wet gas outlet manifold 6, and then, is discharged to the outside.

Then, the dry gas and the wet gas are caused to flow in the first channel grooves 30 and the second channel grooves so as to be directed in reverse directions (counterflow) parallel to the long sides of the dry gas separators 16 and the wet gas separators 17 while interposing the moisture permeable membranes 15 therebetween.

Between the dry gas and the wet gas, which are caused to flow as described above, heat transmission and moisture transmission are performed from the wet gas to the dry gas through the moisture permeable membranes 15, and as shown in FIG. 7, the temperature and humidity of the dry gas are raised. FIG. 7A shows changes of the temperatures of the dry gas and the wet gas in the channel grooves. FIG. 7B shows changes of the humidities of the dry gas and the wet gas in the channel grooves. Temperature efficiency $\epsilon_T$ of such a heat exchange from the wet gas to the dry gas can be obtained by $\epsilon_T = (t_{C2} - t_{C1})/(t_{H1} - t_{C1})$ from measurement values of a temperature $t_{C1}$ of the dry gas, which is measured at the dry gas inlet manifold 5, a temperature $t_{C2}$ of the dry gas, which is measured at the dry gas outlet manifold 7, a temperature $t_{H1}$ of the wet gas, which is measured at the wet gas inlet manifold 8, and a temperature $t_{H2}$ of the wet gas, which is measured at the wet gas outlet manifold 6.

Further, humidity efficiency $\epsilon_H$ of the heat exchange can be obtained by $\epsilon_H = (P_{C2} - P_{C1})/(P_{H1} - P_{C1})$ from measurement values of a humidity $P_{C1}$ of the dry gas, which is measured at the dry gas inlet manifold 5, a humidity $P_{C2}$ of the dry gas, which is measured at the dry gas outlet manifold 7, a humidity $P_{H1}$ of the wet gas, which is measured at the wet gas inlet manifold 8, and a humidity $P_{H2}$ of the wet gas, which is measured at the wet gas outlet manifold 6.

In order to make a comparison with the temperature-humidity exchanger of this Embodiment 1, a temperature-humidity exchanger described in JP 2003-314983 A is prepared as Comparative Example 1. In the temperature-humidity exchanger of this Comparative Example 1, each frame member has a frame shape in which a circumferential frame is made to surround so as to form an inner space open in the vertical direction, and inlet ports and outlet ports, though which gases flow into and out of the inner space, are formed. Moisture permeable membranes are membranes, which are interposed between high-temperature wet gas and low-temperature dry gas and transmit moisture therethrough while performing a heat exchange. The frame members are made of a PPS resin, and the moisture permeable membranes are formed of a PTFE resin similarly to those of Embodiment 1. The frame members and the moisture permeable membranes are sequentially stacked in the stated order so that upper and lower portions of the inner space can be hermetically sealed, and a stacked body airtight to the outside is formed.

Among four side surfaces of the stacked body, one side surface is defined, for example, as an inlet of the moisture gas, and the other side surface is defined as an outlet thereof. Further, another side surface side is defined as an inlet port side of the dry gas, and the other side surface side is defined as an outlet port side thereof. External manifolds for air supply and exhaust, which respectively correspond to the above-described respective inlets and outlets, are arranged.

The frame members and the moisture permeable membranes, which are composed as described above, for example, ten frame members and nine moisture permeable membranes are alternately stacked. Gas channels passing through the inner space are caused to cross with each other, flows of the dry gas and the moisture gas are made to intersect each other, and the moisture exchange through the moisture permeable membranes is thus performed.

FIG. 8 shows temperature efficiencies, humidity efficiencies, dew points, and pressure losses, which were measured for the temperature-humidity exchangers of Embodiment 1 and Comparative Example 1. The temperature efficiency and humidity efficiency of the temperature-humidity exchanger of Embodiment 1 were 92% and 88%, respectively. The temperature efficiency and the humidity efficiency, which were measured for Comparative Example 1, were 75% and 53%, respectively. As described above, the temperature efficiency and the humidity efficiency were able to be improved by 11% and 23%, respectively.

Further, dry gas in which an output dew point was 70° C. was outputted from the temperature-humidity exchanger of Embodiment 1. Meanwhile, the pressure loss was raised to 0.83 kPa (85 mm $H_2O$) which was an allowable pressure or less. Meanwhile, dry gas in which an output dew point was 57° C. was only outputted from the temperature-humidity exchanger of Comparative Example 1.

When the fins 25 are inserted and the channel grooves 30 are divided by half in the stacking direction, the height of the channel grooves is decreased by the thickness of the fins 25 and becomes half or less of the original, and the hydraulic equivalent diameter of the channels concerned is decreased by half. A heat transfer coefficient obtained from the Nusselt number and a mass transfer coefficient obtained from the Sherwood number are inversely proportional to the hydraulic equivalent diameter, and accordingly, are doubled individually. Accompanied with this, heat resistance and mass transfer resistance are individually decreased by half. Further, based on the moisture permeability test for a fabric product, which is defined in JIS-L-1099B, a transfer resistance of each moisture permeable membrane 15 itself was obtained by using a moisture permeability obtained by calculating a mass (g) of the moisture which permeates the moisture permeable membrane 15 in conversion to that per unit area ($cm^2$) of the moisture permeable membrane 15 and that per unit time (hour) in consideration of a vapor partial pressure difference and the film thickness of the moisture permeable membrane 15. As a result, the numbers of mass transfer units (NMTU) as dimensionless numbers regarding the mass transfer, which were analyzed by using separators each of which having the channel grooves 30 divided by half by insertion of the fins 25 and the original channel grooves which were not subjected to such half division, become 7.5 and 4.0, respectively. This can describe that the temperature efficiency and the humidity efficiency are improved.

A description will be made of the reason why the dew point can be raised and the pressure loss can be restricted to be low by flowing the gas in the channel grooves 30 divided by half in the stacking direction as described above, with reference to FIG. 9. FIG. 9 shows a partial cross-sectional view of the temperature-humidity exchange cell 1. Note that, in FIG. 9, solid arrows indicate flows of the temperature, and broken arrows indicate flows of the moisture. In spaces surrounded by the fins 25 and ribs 26 of the wet gas separator 17 and the moisture permeable membranes 15, the wet gas is caused to flow in a depth direction of FIG. 9. In spaces surrounded by the fins 25 and ribs 26 of the dry gas separator 16 and the moisture permeable membranes 15, the dry gas is caused to flow in a front direction of FIG. 9. The temperature of the fins 25 and ribs 26 of the wet gas separator 17 is lower than that of the wet gas by a few degrees Celcius owing to the heat transfer. Accordingly, water droplets 50 are condensed along the fins 25, the ribs 26, and openings of the spaces. The water droplets are formed on the peripheries of the ribs 26 and the surfaces in contact with the moisture permeable membranes 15 owing to an effect of the fins 25 provided in intermediate positions in the stacking direction, and the moisture is effectively transferred also to the upper moisture permeable membrane 15. The surfaces of the moisture permeable membranes 15 are hydrophilic, so the water droplets 50 form liquid films so as to stick to the upper moisture permeable membrane 15 by surface tension of the water against the gravity. The water droplets 50 condensed on the surfaces of the fins 25 and ribs 26 of the upper channel groove 30a and the water droplets 50 condensed on the surfaces of the fins 25 and ribs 26 of the lower channel groove 30b pass through the upper moisture permeable membrane 15 and the lower moisture permeable membrane 15, respectively, and the moisture is transmitted uniformly. It is therefore considered that the humidity efficiency can be improved in such a way.

Further, in the dry gas separator 16 where the dry gas is caused to flow, the fin 25 provided on the center as shown in FIG. 9 increases a surface area thereof, and the dry gas is heated by acceleration of the heat transfer, and evaporation and transfer of the water which passes through the moisture permeable membrane 15 are accelerated. A center line 51 shown in the inside of the fin 25 shows a plane of symmetry of the upper and lower channel grooves 30a and 30b. The center line serves as a thermally neutral heat insulating surface. Accordingly, there is no heat transfer in the inside of the fin 25 in the stacking direction, and the heat transferred to the fin 25 is entirely spent for the heating of the dry gas flowing in the closed spaces and the evaporation of the water transferred through the moisture permeable membranes 15. Further, thermal deformation owing to a difference between both surfaces, which is as seen when different gases are caused to flow on both surfaces of the separator as in the conventional case, is remarkably reduced. This greatly contributes also to lifetime elongation and reliability enhancement of the separator material.

Further, the end portions of the plurality of upper and lower channel grooves 30a and 30b arrayed laterally are aggregated to the aggregate communication grooves 34a and 34b, each number of which is four, and then are made to communicate with the dry gas supply manifold 35 and the dry gas exhaust manifold 36. Accordingly, changes in the hydraulic equivalent diameter are small, and even if the depth of the channel grooves 30a and 30b is decreased, the increase of the pressure loss is restricted to be small.

Further, the moisture permeable membranes 15 are supported from both surfaces thereof by the low-height ribs 26 projecting vertically from the fins 25, and accordingly, bending strength thereof is increased by the lowering of the height of the ribs 26, and the moisture permeable membranes 15 are surely supported. Further, the moisture permeable membranes 15 are surely supported owing to the reduction of the thermal deformation of the fins 25. Owing to the above-described factors, the deformation of the moisture permeable membranes 15 is small even if a pressure difference of 4.9 kPa (500 mm $H_2O$) or more occurs between the wet gas and the dry gas, thus making it possible to prevent the channels from being closed and the pressure loss from being increased, both of which may be caused by the deformation.

Further, the dry gas separators 16 and the wet gas separators 17 can be integrally molded by the resin molding method.

Accordingly, assembly steps such as fitting, alignment, and adhesion of the ribs 26 are simplified, thus making it also possible to reduce the number of parts. In addition, it is made possible to decrease the height of the channels without increasing the number of stacked separators.

In the temperature-humidity exchanger as described above, the same gas is caused to flow to the channel grooves divided by half in the stacking direction, thus making it possible to improve the temperature efficiency and the humidity efficiency, and to raise the dew point of the outputted gas. Further, even if the depth of the channel grooves is decreased, the channel grooves divided by half can be regarded to have a double depth in total, and in addition, the aggregate communication grooves which aggregate the plural channel grooves are made to communicate with the channel grooves. Accordingly, a spot where the hydraulic equivalent diameter of the channel where the gas is caused to flow becomes extremely small is not found, and the pressure loss can be restricted to the allowable pressure loss or less.

Further, in the plural linear channel grooves individually provided in the dry gas separators and the wet gas separators, the dry gas and the wet gas are caused to flow so as to be directed in the reverse directions (counterflow) while interposing the moisture permeable membranes therebetween. Accordingly, the heated and humidified dry gas in which the dew point is high and the pressure is high can be outputted.

Further, the moisture permeable membranes, the dry gas separators, and the wet gas separators are stacked in the vertical direction, and are arranged. Thus, the liquid films of the condensed moisture moisten the surfaces of the moisture permeable membranes, the moisture is transmitted to the dry gas flowing immediately under the moisture permeable membranes, and a direction of the gravity which transfers the moisture vertically downwards and a direction in which the moisture is transferred through the membranes are made to coincide with each other. Accordingly, the moisture is transferred easily, the humidity efficiency can be improved, and the dry gas in which the dew point is high can be outputted.

Further, since it is unnecessary to combine heat utilization of a coolant, extra cost is not required, and an inexpensive temperature-humidity exchanger can be provided.

Further, by adjusting the thickness of the fins which divide the channel grooves by half, it is possible to change the height of the channels, and the optimum channels can be designed in consideration of a trade-off between the pressure loss, the heat resistance, and the mass transfer resistance. To be specific, when the thickness of the fins is increased, the height of the channels is decreased by that amount, and the pressure loss is increased; however, transfer performance of steam is improved. As described above, appropriate designing can be performed depending on specifications of the fuel cell.

Embodiment 2

Figure 10:
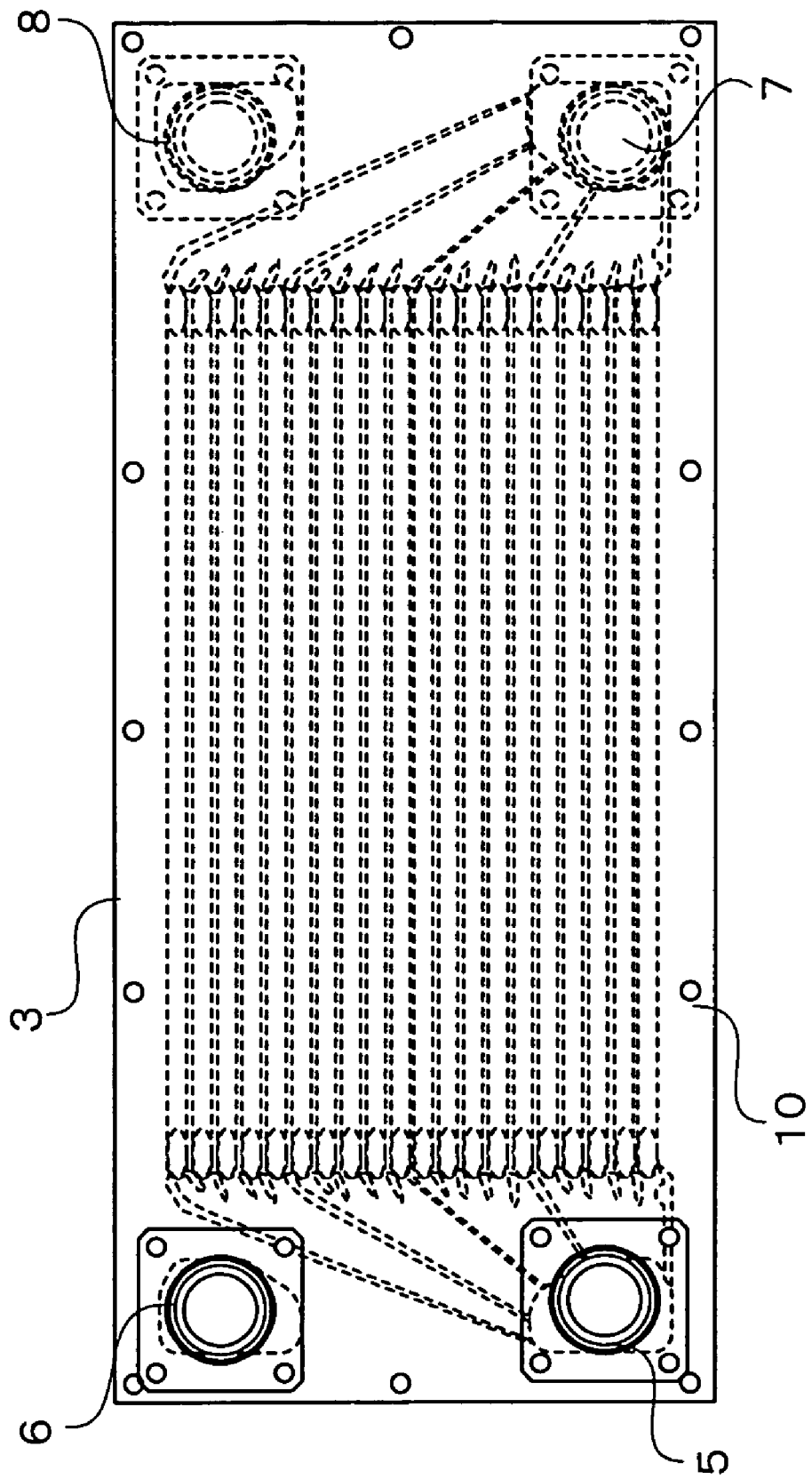
FIG. 10 An upper plan view of a temperature-humidity exchanger of Embodiment 2 of the present invention.
Figure 11:
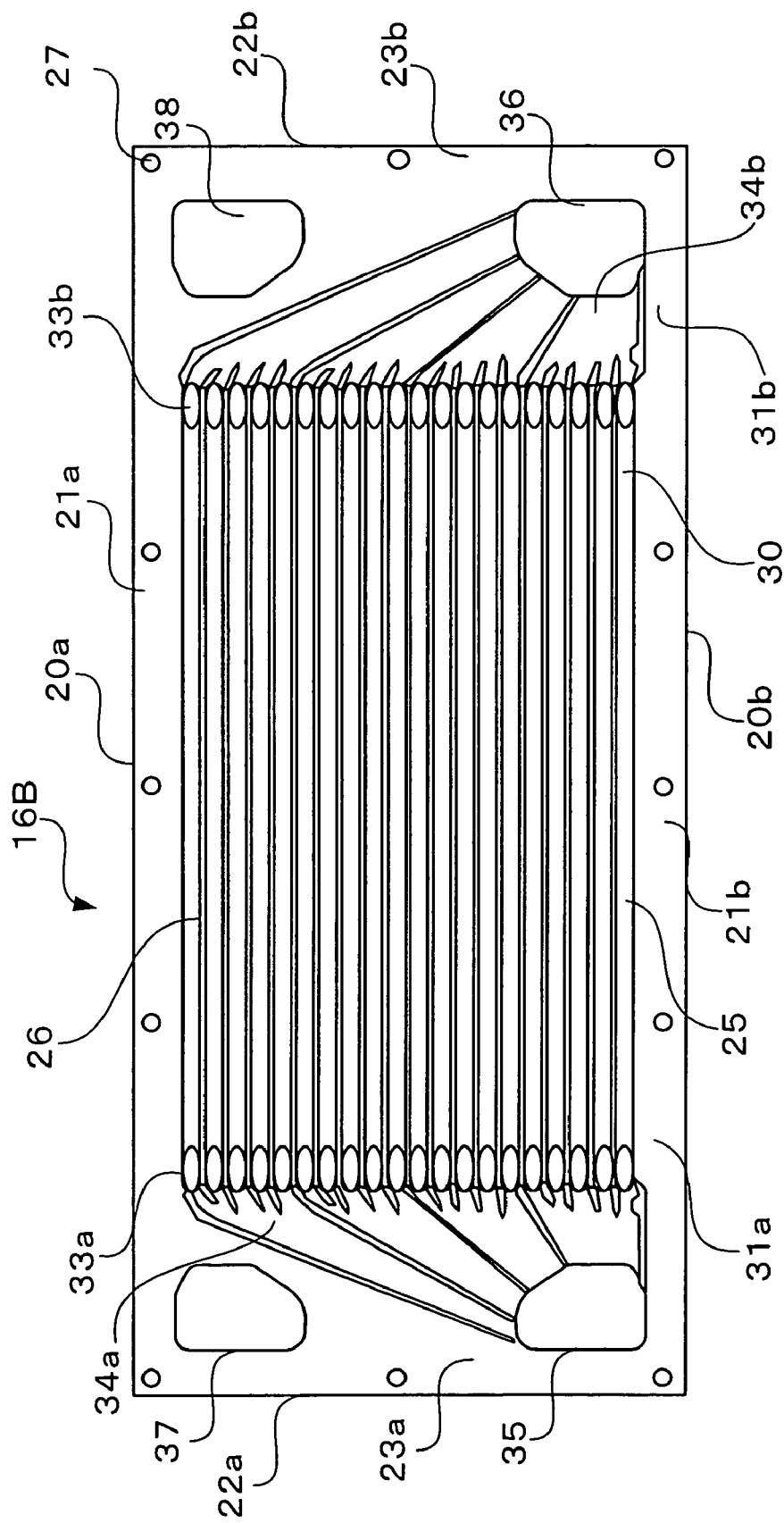
FIG. 11 A plan view of a dry gas separator of the temperature-humidity exchanger of Embodiment 2.

FIG. 10 is an upper plan view of a temperature-humidity exchanger of Embodiment 2 of the present invention. FIG. 11 is a plan view of a dry gas separator of a temperature-humidity exchange cell according to Embodiment 2.

The temperature-humidity exchanger according to Embodiment 2 is different from the temperature-humidity exchanger according to Embodiment 1 in positions of the dry gas inlet manifold 5, the dry gas outlet manifold 7, the wet gas inlet manifold 8, and the wet gas outlet manifold 6, and is the same thereto in other constructions. Accordingly, a description of the same portions is omitted.

As shown in FIG. 10, the dry gas inlet manifold 5 and dry gas outlet manifold 7 of the temperature-humidity exchanger according to Embodiment 2 are provided at positions axisymmetric to each other with respect to a long-side center line.

In the dry gas separator 16 of Embodiment 1, the dry gas supply manifold 35 and the dry gas exhaust manifold 36 are provided at the positions point-symmetric to each other with respect to the center point of the dry gas separator 16. Further, the wet gas exhaust manifold 37 and the wet gas supply manifold 38 are provided at the positions point-symmetric to each other with respect to the center point of the dry gas separator 16. The dry gas supply manifold 35 and the wet gas exhaust manifold 37 are provided at the positions axisymmetric to each other with respect to the center line of the short side 22a.

Further, the wet gas separator 17 is one in which the dry gas separator 16 is turned inside out with respect to the center line of the short side 22a as a center axis.

On the other hand, in the dry gas separator 16B according to Embodiment 2, the dry gas supply manifold 35 and the dry gas exhaust manifold 36 are provided at the positions axisymmetric to each other with respect to the center line of the long sides 20a and 20b of the dry gas separator 16B. Further, the wet gas exhaust manifold 37 and the wet gas supply manifold 38 are provided at the positions axisymmetric to each other with respect to the center line of the long sides 20a and 20b of the dry gas separator 16.

Further, the wet gas separator is one in which the dry gas separator 16B is turned inside out with respect to the center line of the short sides 22a and 22b as a center axis.

As describe above, ones of the separators having the same shape are turned inside out, and the ones of the separators and the others thereof are alternately stacked while interposing the moisture permeable membranes 15 therebetween, thus making it possible to alternately form the channels of the humidifying gas and the channels of the humidified gas while interposing the moisture permeable membranes 15 therebetween.

Heretofore, as shown in FIGS. 7 and 8 of JP 2000-164229 A, two types of plates with different shapes have been required as the dry gas separator and the wet gas separator. However, if the separators are used, in each of which the manifolds are provided at the positions point-symmetric to each other with respect to the center line as in Embodiment 1 or at the positions axisymmetric to each other with respect to the center line of the long side, the separators are alternately stacked while interposing the moisture permeable membranes therebetween, thus making it possible to reduce the number of components. In addition, separators for the temperature-humidity exchanger, which are excellent in mass productivity and processability, can be provided.

Embodiment 3

FIG. 12 is a side view of a temperature-humidity exchanger according to Embodiment 3 of the present invention. The temperature-humidity exchanger according to Embodiment 3 is different from that of Embodiment 1 in that the temperature-humidity exchange stacked body of Embodiment 1 is divided by half, and that a direction in which the dry gas is caused to flow in one of the temperature-humidity exchange stacked bodies is reverse to a direction in which the dry gas is caused to flow in the other temperature-humidity exchange stacked body. The other constructions are the same as those of Embodiment 1, so a description of the same portions is omitted.

As shown in FIG. 12, in the temperature-humidity exchanger of Embodiment 3, two temperature-humidity exchange stacked bodies on the upper and lower sides 41a and 41b are sandwiched by the inlet retainer plate 3 and the outlet retainer plate 4. Between a lowermost dry gas separator 42 of the temperature-humidity exchange stacked body on the upper side 41a and an uppermost wet gas separator 43 of the temperature-humidity exchange stacked body on the lower side 41b, an intermediate separator 44 is inserted, in which holes are opened only at positions corresponding to the second wet gas supply manifold and second dry gas exhaust manifold of the wet gas separator 43. The intermediate separator 44 is a rectangular plate with the same shape as that of the dry gas separator 42. The dry gas separator 42 of the temperature-humidity exchange stacked body on the upper side 41a is disposed at a position point-symmetric to the dry gas separator of the temperature-humidity exchange stacked body on the lower side 41b by 180 degrees with respect to the center point thereof. The dry gas exhaust manifold of the temperature-humidity exchange stacked body on the lower side 41b is made to communicate with the dry gas supply manifold of the temperature-humidity exchange stacked body on the upper side 41a. Meanwhile, the wet gas exhaust manifold of the temperature-humidity exchange stacked body on the upper side 41a is made to communicate with the wet gas supply manifold of the temperature-humidity exchange stacked body on the lower side 41b. Lower sides of the dry gas supply manifold and wet gas exhaust manifold of the temperature-humidity exchange stacked body on the upper side 41a are partitioned by the intermediate separator 44. Further, upper sides of the dry gas supply manifold and wet gas exhaust manifold of the temperature-humidity exchange stacked body on the lower side 41b are partitioned by the intermediate separator 44.

Next, a description will be made of flows of the gases. The low-temperature dry gas is supplied from the lower dry gas inlet manifold 5, and is caused to flow into the channel grooves of the dry gas separators of the temperature-humidity exchange stacked body on the lower side 41b, thereby causing the exchange of the heat and the moisture between the low-temperature dry gas and the wet gas through the moisture permeable membranes. The dry gas which was caused to flow in the channel grooves and has reached the dry gas exhaust manifold of the lower temperature-humidity stacked body 41b passes through the holes of the intermediate separator 44, and is caused to flow to the dry gas supply manifold of the temperature-humidity exchange stacked body on the upper side 41a. Further, the dry gas is caused to flow to the channel grooves of the dry gas separators of the temperature-humidity exchange stacked body on the upper side 41a, and is guided to the dry gas exhaust manifold of the temperature-humidity exchange stacked body on the upper side 41a. Then, the dry gas is outputted from the dry gas outlet manifold 7, and is supplied to the fuel cell.

Meanwhile, the high-temperature wet gas discharged from the fuel cell is supplied from the upper wet gas inlet manifold 8, and is caused to flow into the channel grooves of the wet gas separators of the temperature-humidity exchange stacked body on the upper side 41a, thereby causing the exchange of the heat and the moisture between the high-temperature wet gas and the dry gas through the moisture permeable membranes. The wet gas which was caused to flow in the channel grooves and has reached the wet gas exhaust manifold of the temperature-humidity exchange stacked body on the upper side 41a passes through the holes of the intermediate separators 44, and is caused to flow to the wet gas supply manifold of the temperature-humidity exchange stacked body on the lower side 41b. Further, the wet gas is caused to flow in the channel grooves of the wet gas separators of the temperature-humidity exchange stacked body on the lower side 41b, and is guided to the wet gas exhaust manifold of the temperature-humidity exchange stacked body on the lower side 41b. Then, the wet gas is discharged from the wet gas outlet manifold 6.

A drain (not shown) which receives water droplets formed by condensation caused by this confluence is provided below the wet gas outlet manifold 6.

Meanwhile, the low-temperature dry gas is caused to flow to a direction completely reverse to that of the wet gas.

As described above, the temperature-heat exchange is performed at two stages, and nonuniformities of the humidity and the temperature, which are caused at the first stage, are resolved, thus making it possible to flow the uniform gas again. Accordingly, the humidity efficiency and the temperature efficiency can be further improved.

The low-temperature dry gas forms the flow completely reverse to that of the wet gas, and flows vertically upwards. As described above, Embodiment 3 is characterized in that both of the wet gas and the dry gas are caused to flow at two stages, and that the wet gas is caused to flow vertically downwards, that is, from the high-temperature side to the low-temperature side, and the dry gas is caused to flow vertically upwards, that is, from the low-temperature side to the high-temperature side. Thus, three directions in total, which are the direction in which the water droplets drop, the direction in which the moisture is transferred through the moisture permeable membranes, and the direction in which the heat is transferred from the high-temperature side to the low-temperature side, completely coincide with one another, and the temperature-humidity exchanger of Embodiment 3 can exert excellent performance in temperature-humidity exchange.

The invention claimed is:

1. A temperature-humidity exchanger comprising:
   a moisture permeable membrane that transmits moisture therethrough;
   a dry gas separator in which low-temperature dry gas is caused to flow; and
   a wet gas separator in which high-temperature wet gas is caused to flow, in which the moisture permeable membrane, the dry gas separator, another moisture permeable membrane, and the wet gas separator are repeatedly stacked in this stated order, wherein in the dry gas separator and the wet gas separator:
      a plurality of channel grooves that are divided by half in the stacking direction, are open to a direction in which the channel grooves come into contact with the moisture permeable membrane, and are arrayed parallel to one another are provided;
      an aggregate communication groove that is made to communicate with both end portions of the plurality of channel grooves, for aggregating gas caused to flow through the channel grooves to at least one is provided;
      a supply manifold and an exhaust manifold that are made to communicate with the aggregate communication groove and penetrate the separators in the stacking direction are provided; and
      a flow of the dry gas caused to flow in the channel grooves of the dry gas separators and a flow of the wet gas caused to flow in the channel grooves of the wet gas separators are counterflows.

2. The temperature-humidity exchanger according to claim 1, wherein a rib of the channel grooves of the dry gas separator and a rib of the channel grooves of the wet gas separator are opposite to each other and sandwich the moisture permeable membrane therebetween.

3. The temperature-humidity exchanger according to claim 1,
wherein in the dry gas separator, the supply manifold of the dry gas and the exhaust manifold of the dry gas, and the supply manifold of the wet gas and the exhaust manifold of the wet gas, are respectively provided at positions point-symmetric to each other with respect to a center point of the dry gas separator or axisymmetric to each other with respect to a center line of one side of the dry gas separator; and
the wet gas separator is one in which the dry gas separator is turned inside out with respect to a center line of another side as a center axis.

4. The temperature-humidity exchanger according to claim 1, wherein a dry gas inlet manifold and a wet gas outlet manifold are provided on a lowermost layer in the stacking direction; and
a dry gas outlet manifold and a wet gas inlet manifold are provided on an uppermost layer in the stacking direction.

5. A temperature-humidity exchanger comprising:
a plurality of temperature-humidity exchange stacked bodies, said temperature-humidity exchange stacked bodies including a moisture permeable membrane that transmits moisture therethrough;
a dry gas separator in which low-temperature dry gas is caused to flow, and
a wet gas separator in which high-temperature wet gas is caused to flow, in which the moisture permeable membrane, the dry gas separator, another moisture permeable membrane, and the wet gas separator are repeatedly stacked in the stated order,
wherein in the temperature-humidity exchange stacked bodies, a dry gas exhaust manifold of the temperature-humidity exchange stacked body on an upper side of the temperature-humidity exchanger is made to communicate with a dry gas supply manifold of the temperature-humidity exchange stacked body on an lower side of the temperature-humidity exchanger,
a wet gas exhaust manifold of the temperature-humidity exchange stacked body on the lower side of the temperature-humidity exchanger is made to communicate with a wet gas supply manifold of the temperature-humidity exchange stacked body on the upper side of the temperature-humidity exchanger, and
the temperature-humidity exchange stacked body on the upper side of the temperature-humidity exchanger and the temperature-humidity exchange stacked body on the lower side of the temperature-humidity exchanger are stacked on each other to be partitioned by an intermediate separator,
wherein gases are mixed on a first side of the intermediate separator prior to flowing to a second side of the intermediate separator.

6. The temperature-humidity exchanger according to claim 5, wherein an outlet retainer plate, the temperature-humidity exchange stacked body on the upper side of the temperature-humidity exchanger, the intermediate separator, the temperature-humidity exchange stacked body on the lower side of the temperature-humidity exchanger, and an inlet retainer plate are stacked in the stated order vertically downwards,
the wet gas is caused to flow from an upper high-temperature side to a lower low-temperature side, and
the dry gas is caused to flow from the lower low-temperature side to the upper high-temperature side.

7. The temperature-humidity exchanger according to claim 5, wherein a drain is disposed below the wet gas exhaust manifold.

* * * * *

UNITED STATES PATENT AND TRADEMARK OFFICE
CERTIFICATE OF CORRECTION

PATENT NO. : 7,585,355 B2
APPLICATION NO. : 10/581359
DATED : September 8, 2009
INVENTOR(S) : Gonjo et al.

It is certified that error appears in the above-identified patent and that said Letters Patent is hereby corrected as shown below:

On the title page, Item (87), the PCT information is incorrect. Item (87) should read:

-- (87)  PCT Pub. No.: WO2005/075921

PCT Pub. Date: Aug. 18, 2005 --

Signed and Sealed this

Third Day of November, 2009

David J. Kappos
*Director of the United States Patent and Trademark Office*